(12) United States Patent
Shenfield

(10) Patent No.: US 8,560,724 B2
(45) Date of Patent: Oct. 15, 2013

(54) SYSTEM AND METHOD FOR TRANSFORMATION OF SYNDICATED CONTENT FOR MOBILE DELIVERY

(75) Inventor: Michael Shenfield, Richmond Hill (CA)

(73) Assignee: BlackBerry Limited, Waterloo, Ontario (CA)

( * ) Notice: Subject to any disclaimer, the term of this patent is extended or adjusted under 35 U.S.C. 154(b) by 1499 days.

(21) Appl. No.: 11/680,725

(22) Filed: Mar. 1, 2007

(65) Prior Publication Data

US 2008/0215744 A1 Sep. 4, 2008

(51) Int. Cl.
*G06F 13/00* (2006.01)

(52) U.S. Cl.
USPC .................. 709/236; 709/246; 709/250

(58) Field of Classification Search
USPC ......... 709/223, 203, 217, 219, 230, 231, 236, 709/246, 250
See application file for complete search history.

(56) References Cited

U.S. PATENT DOCUMENTS

| | | | | |
|---|---|---|---|---|
| 6,055,543 A | * | 4/2000 | Christensen et al. ................. | 1/1 |
| 6,714,941 B1 | * | 3/2004 | Lerman et al. ......................... | 1/1 |
| 7,467,391 B2 | * | 12/2008 | Myllymaki et al. ........... | 719/320 |
| 7,720,553 B2 | * | 5/2010 | Fayyad et al. ..................... | 700/51 |
| 7,853,928 B2 | * | 12/2010 | Attinella ........................ | 717/128 |
| 2002/0107985 A1 | | 8/2002 | Hwang et al. .................. | 709/246 |
| 2004/0003394 A1 | | 1/2004 | Ramaswamy | |
| 2005/0043060 A1 | | 2/2005 | Brandenberg et al. | |
| 2005/0165789 A1 | * | 7/2005 | Minton et al. ................... | 707/10 |
| 2006/0129917 A1 | | 6/2006 | Volk et al. ...................... | 715/513 |
| 2006/0173985 A1 | * | 8/2006 | Moore ............................ | 709/223 |
| 2006/0265489 A1 | | 11/2006 | Moore | |
| 2007/0197196 A1 | | 8/2007 | Shenfield et al. ........... | 455/412.2 |
| 2007/0260744 A1 | | 11/2007 | Shenfield | |
| 2008/0065688 A1 | | 3/2008 | Shenfield ....................... | 707/103 |
| 2008/0071389 A1 | * | 3/2008 | Fayyad et al. ..................... | 700/1 |
| 2008/0133569 A1 | * | 6/2008 | Vu et al. ......................... | 707/102 |
| 2008/0263309 A1 | * | 10/2008 | Attinella ....................... | 711/173 |
| 2008/0294976 A1 | * | 11/2008 | Rosenberg ................... | 715/209 |
| 2011/0307479 A1 | * | 12/2011 | Yin et al. ...................... | 707/728 |

FOREIGN PATENT DOCUMENTS

| | | |
|---|---|---|
| WO | 0221472 | 3/2002 |
| WO | WO 2006/010979 A1 | 9/2006 |
| WO | 20070011917 | 1/2007 |

OTHER PUBLICATIONS

European Search Report, EP 07103363.3, dated Aug. 9, 2007.
Communication pursuant to Article 96(2) EPC, EP 07103363.3, dated Aug. 23, 2007.
Extended European Search Report, EP 08151615.5, dated Mar. 12, 2008.
Communication pursuant to Article 94(3) EPC, EP 07103363.3, dated Apr. 17, 2008.
Communication pursuant to Article 94(3) EPC, EP 07103363.3, dated Nov. 6, 2008.

(Continued)

*Primary Examiner* — Viet Vu
(74) *Attorney, Agent, or Firm* — Brinks Hofer Gilson & Lione

(57) ABSTRACT

A method and system for embedding metadata for mobile delivery into a syndicated content feed, the method having the steps of receiving content from a syndicated content provider; embedding into the content the metadata using a standard schema extension mechanism, thereby creating modified content; and publishing the modified content. Also, a delivery server and a method within the delivery server to repackage content into a single format wrapped content envelope for delivery.

14 Claims, 8 Drawing Sheets

(56) References Cited

OTHER PUBLICATIONS

Tony Hammond et al: "The Role of RSS in Science Publishing Syndication and Annotation on the Web" D-LIB Magazine, [Online] vol. 10, No. 12, Dec. 2004, XP002436278 ISSN: 1082-9873 URL: http://webdoc.sub.gwdg.de/edoc/aw/d-lib/dlib/december04/hammond/12hammond.html> [retrieved on Jun. 5, 2007] *the whole document *.
EP08151615 Communication under Article 94(3) EPC dated Nov. 18, 2009.
SIPO First Office Action in Chinese Appln. No. 200810082368.1, dated Dec. 7, 2010 (9p).
Korean Patent Application No. 10-2008-0018811, Examiner's Report dated Jul. 28, 2010.
Japanese Patent Application No. 2008-45111, Office Action dated Sep. 29, 2010.
EP Patent Application No. 10176590.7, European Search Report dated Oct. 4, 2010.
Mexican Patent Application No. MX/a/2008/002691, Office Action dated Oct. 8, 2010.
J. Luoma et al., "*A Metadata Framework for Internet Media Guides: Metadata Envelope*", http://tools.ietf.org/pdf/draft-luoma-mmusic-img-metada-envelope-00.pdf. (21p).
Japanese Office Action to Japanese Patent Application No. 2011-150105 and English Translation dated Aug. 21, 2012, (5p).
EP08151615 Communication under Article 94(3) EPC dated Jan. 27, 2009.
European Patent Office Communication Oral Proceedings for EP Application No. 08 151 615.5, dated Jan. 27, 2011, (11p).
Comer, Douglas, "*Internetworking With TCP/IP*," Principles, Protocols, and Architecture—Fourth Edition, Prentice Hall, New Jersey, (2000), pp. 97-118.
Roy, Jaideep, et al., "*Understanding Web Services*," IT Pro Perspectives, (2001), pp. 69-73.

* cited by examiner

SYSTEM AND METHOD FOR TRANSFORMATION OF SYNDICATED CONTENT FOR MOBILE DELIVERY

FIELD OF THE DISCLOSURE

The present method and system relate to dynamic content delivery in a mobile environment and, in particular, to delivery of content of a variety of formats.

BACKGROUND

Users of mobile devices or mobile user equipment (UE) are increasingly becoming more sophisticated in terms of the functionality that they require from their mobile devices and the way that they access data from the mobile devices.

Dynamic content delivery allows users to have information or data pushed to them rather than having to go and seek out the data. Examples of data could include stock quotes, weather updates, traffic updates, dynamic wallpaper, ads, applications or other data desirable to a user.

Current technologies for mobile devices such as wireless application protocol (WAP) have the ability to push content. However, WAP requires websites to be rewritten to satisfy the wireless application protocol and provide users with a uniform site that does not change to accommodate a user's capabilities to view a site.

Other alternatives include SMS based push and broadcast or cell broadcast. In the broadcast case, delivery cannot be customized to the needs of a particular user or the capabilities of a particular device. The systems therefore have no intelligence associated with them. A better solution is required for mobile devices.

A problem further arises when content is provided in different formats. A delivery system needs to be capable of delivering the content regardless of the format.

BRIEF DESCRIPTION OF THE DRAWINGS

The present disclosure will be better understood with reference to the drawings in which.

DETAILED DESCRIPTION

Figure 1:
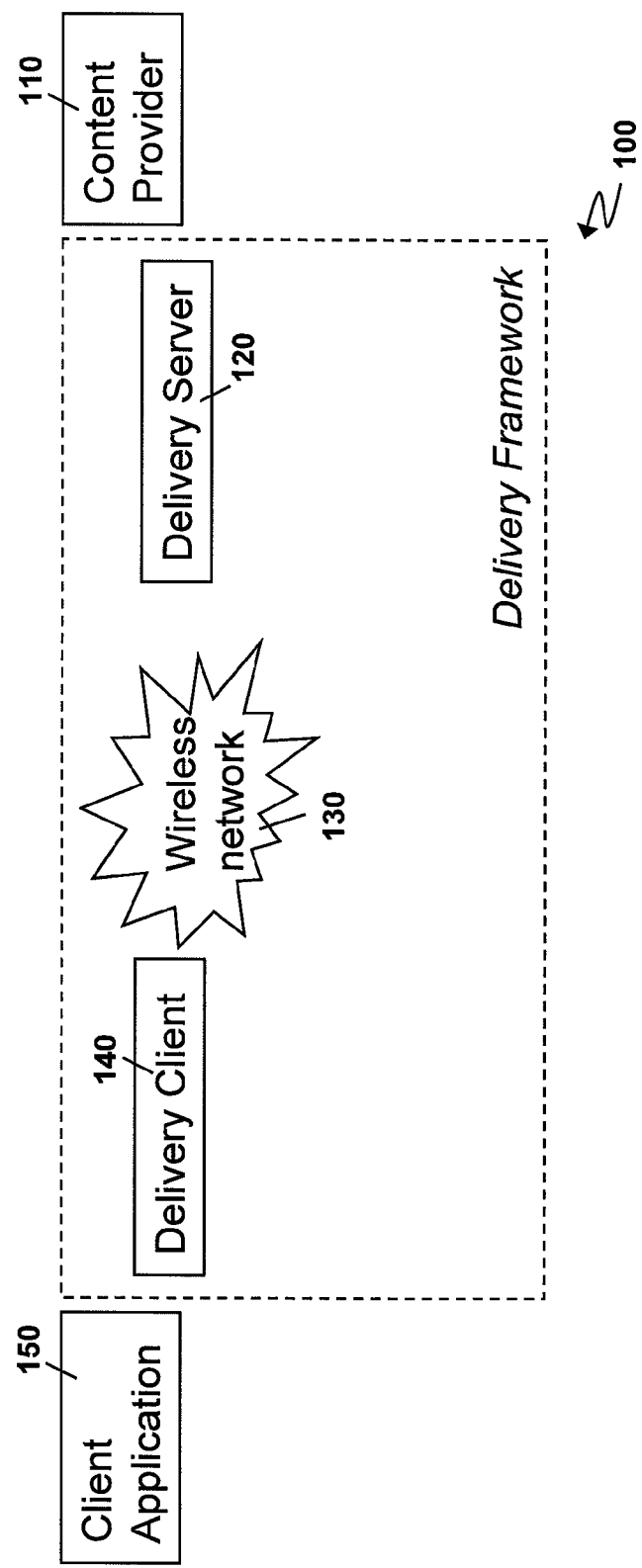
FIG. 1 is a block diagram showing logical components within a delivery framework.

The present system and method provide for the transformation of syndicated content for a mobile delivery. Specifically, a content publisher is placed between syndicated content providers and delivery server, where the content publisher is adapted to insert mobile device metadata to facilitate mobile delivery. The content publisher then publishes the modified syndicated content at the delivery server. As will be appreciated, by adding mobile delivery metadata, the content publisher does not need to alter existing syndicated content when publishing. The model ensures that the same content could be delivered to both wired and wireless clients.

A content publisher, as described herein, is a logical entity that may be part of the content provider or may be a separate entity entirely.

In particular, the content publisher is adapted to receive content from a syndicated content provider in an XML based syndicated feed in a preferred embodiment. Such an XML based syndicated feed could, for example, include RSS or Atom. The content publisher adds metadata at the earliest opportunity within the syndicated content. The metadata in a preferred embodiment comprises a specified namespace defining XML elements that contain mobile delivery metadata. The namespace URL points to XML schema document that defines these elements (i.e. their names, types, valid values, etc.).

Once the content publisher publishes the content that has been modified by adding metadata, a delivery server can then retrieve the content, repackage it into a single format for delivery to various delivery clients. Preferably, the repackaging involves extracting any metadata that was added by a content provider and wrapping this metadata around the syndicated content. The wrapped content can then be delivered to the delivery client regardless of the content that is wrapped.

Non-syndicated content can similarly be wrapped. In one embodiment non-syndicated content can be found in an enveloped metadata model where it has previously been wrapped in metadata. In this case, the delivery server merely needs to extract metadata targeted for the delivery server. If the non-syndicated content is not in an enveloped model, the delivery server can wrap the content in default metadata that is derived from default channel settings.

The present disclosure therefore provides a method for embedding metadata for mobile delivery into a syndicated content feed, the method comprising the steps of receiving content from a syndicated content provider; embedding into the content the metadata using a standard schema extension mechanism, thereby creating modified content; and publishing the modified content.

The present disclosure further provides a method for repackaging content at a delivery server for delivery to a mobile device comprising the steps of retrieving published content having embedded metadata and embedded content; extracting from the published content the embedded metadata; wrapping the embedded content in the extracted metadata, creating wrapped content; and storing the wrapped content for delivery.

The present disclosure further provides a content publisher adapted to embed metadata into a syndicated content feed for mobile delivery, the content publisher comprising a receiver adapted to receive content from a syndicated content provider; means for embedding into the content the metadata using a standard schema extension mechanism, thereby creating modified content; and publishing means adapted to publish the modified content.

The present disclosure still further provides a delivery server adapted to repackage content for delivery to a mobile device comprising retrieving means adapted to retrieve published content having embedded metadata and embedded content; extracting means adapted to extract from the published content the embedded metadata; wrapping means adapted to wrap the embedded content in the extracted metadata, creating wrapped content; and storage adapted to store the wrapped content for delivery.

Reference is now made to FIG. 1. A push system for delivering dynamic content to a client application is illustrated. The system of FIG. 1 is a simplified system and shows logical components that need to be in a dynamic content delivery architecture. However, as will be appreciated by those skilled in the art, other components could exist or various components could be grouped together.

Architecture 100 includes a content provider 110. Content provider 110 is arranged to provide dynamic content to users. Examples can include, for example, a website selling books. Content provider 110 may periodically provide a list of newly released books which can either be sent to subscribers that are subscribed to the website or to a delivery server that manages subscriptions.

A delivery server 120 communicates over wireless network 130 with a delivery client 140 that is located on a mobile device in a preferred embodiment. Delivery client 140 receives the content that is being delivered from content provider 110 and can communicate the content with a client application 150, which ultimately consumes the content.

Figure 2:
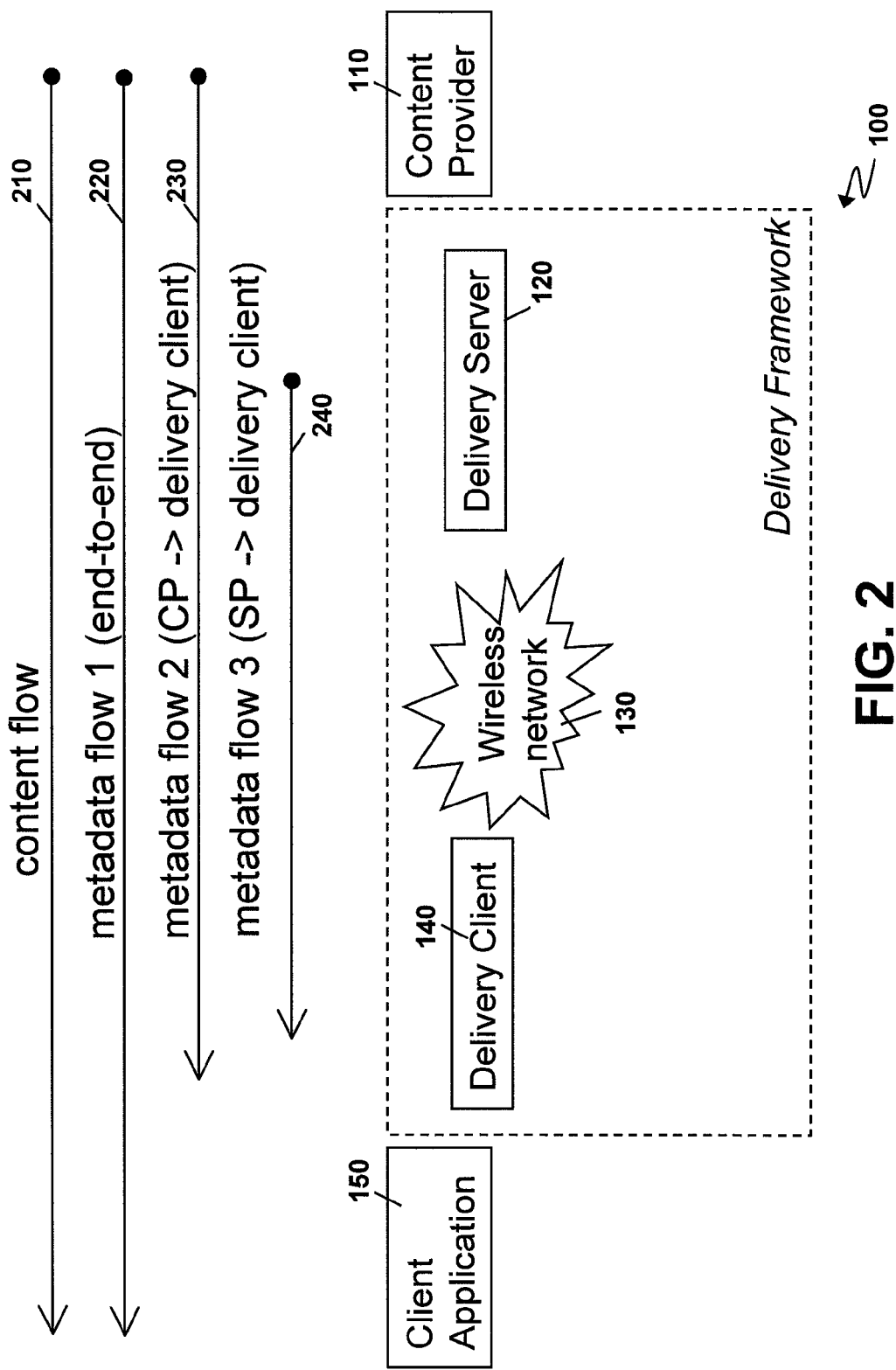
FIG. 2 is a block diagram illustrating flow of metadata between the logical components of FIG. 1.

Reference is now made to FIG. 2. In order to add intelligence to a system, content is associated with metadata. Metadata, in this case, is defined as data that can be used by a processing element to manipulate the content. As will be appreciated, a generic push system requires metadata to allow various content providers and applications to exist within the system. The metadata can be in various forms, including processing parameters or rules, or a processing handler, code or reference provided directly or a link to a processing handler, code or rules in another location.

As can be see in FIG. 2, content passes from content provider 110 to a client application 150, as illustrated by arrow 210. Metadata, which provides instructions to various components within the architecture 100, can also pass between components within architecture 100, usually along with the content. For example, arrow 220 illustrates metadata that originates at the content provider and is transparent to the delivery system until it reaches a client application 150.

Arrow 230 shows metadata created by a content provider 110 that is intended for delivery client 140 and thus only flows to the delivery client 140.

Arrow 240 illustrates metadata generated by delivery server 120 and intended for delivery client 140, and thus is first associated with the content at delivery server 120 and stripped from the content at delivery client 140. Examples of where this could occur include agreements between a user and a service provider regarding a billing plan and the level of service to be provided, where the service provider can use the metadata to limit the services available or provide enhanced services.

Figure 3:
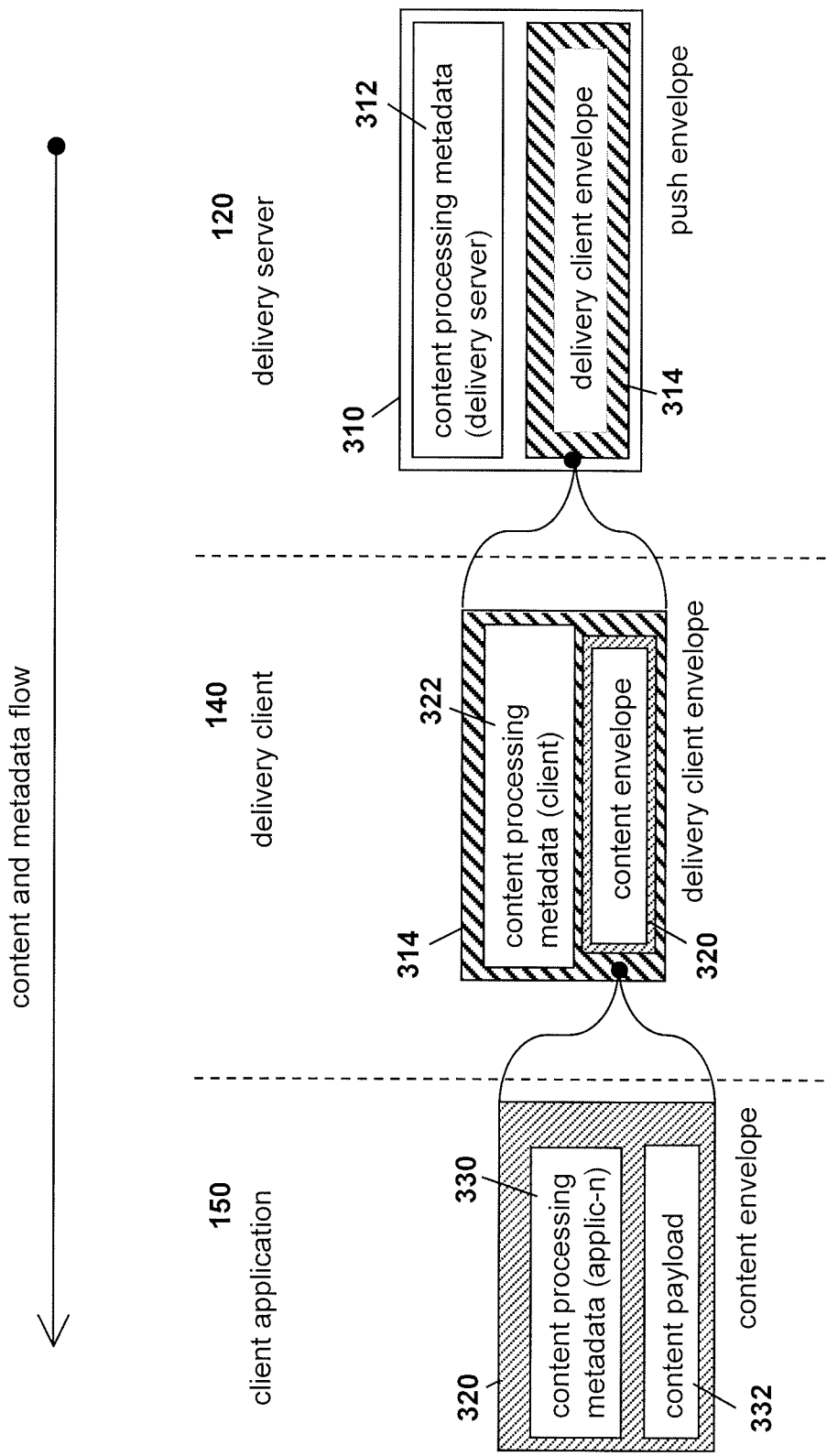
FIG. 3 is a block diagram showing an envelope model for content and metadata.

Reference is now made to FIG. 3. FIG. 3 illustrates a multilayered envelope model for content metadata.

A delivery server 120 receives a push envelope 310 that includes content processing metadata 312 for the delivery server 120 and a delivery client envelope 314. The delivery server 120 extracts the content processing metadata 312 and uses this metadata to process delivery client envelope 314. Metadata 312 dictates to delivery server 120 what to do with the delivery client envelope 314.

Delivery client envelope 314 is passed to delivery client 140, where it is broken into a content envelope 320 and a content processing metadata 322. Content process metadata 322 is used by delivery client 140 to process the content envelope 320. For example, this can be used to instruct delivery client 140 to perform a replacement of previously delivered content envelope 320 with the latest envelope if client application 150 is only interested in the latest version of the content.

Content envelope 320 is passed to client application 150. Content envelope 320 includes content processing metadata 330 for the application and content payload 332 that is to be consumed by client application 150.

As will be appreciated by those skilled in the art, the nesting of envelopes in accordance with FIG. 3 provides for a rich dynamic environment in which processing can occur at any processing element of the architecture and in which the content provider 110 can specify how specific content is to be dealt with. In one embodiment, metadata is directed to a particular logical element and is opaque to other processing elements.

As will further be appreciated, metadata may only be included for various stages of the delivery of content. For example, metadata may only be required between the delivery server 120 and delivery client 140 and thus no metadata for client application 150 would be included.

Other alternatives would be evident to those skilled in the art.

As will further be appreciated, content provider 110 in some cases will be a generic syndicated content provider and will have no ability or intention to add metadata for the content that is being delivered. In this case, a content publisher, as described with reference to FIGS. 4, 5, 6 and 7 is provided.

Figure 4:
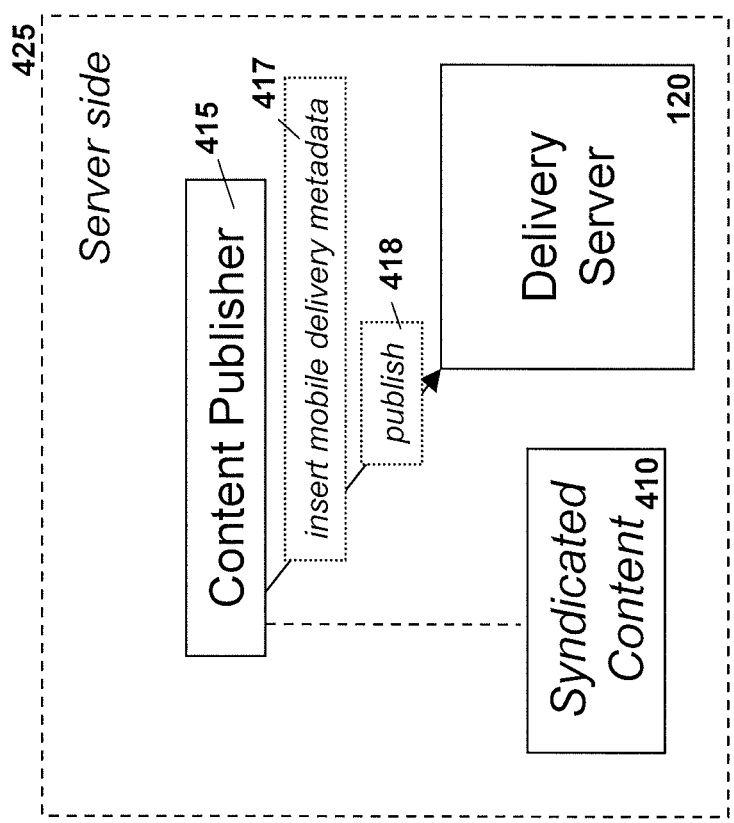
FIG. 4 is a block diagram of a server side of a delivery framework in which a content publisher has been added.

Reference is now made to FIG. 4. A syndicated content provider 410 includes content that a mobile user desires. A content publisher 415 retrieves content from a syndicated content provider 410. The content publisher 415 is adapted to insert mobile delivery metadata 417 and publish 418 content. This content is then retrieved by delivery server 120 and delivered to a mobile device. As will further be appreciated, all of this is performed on server side 425 as opposed to the client side (which includes delivery client 140 and client application 150 as illustrated in FIG. 1).

As will be appreciated by those skilled in the art, content publisher 415 may be part of syndicated content provider 410 or may be a separated entity.

An example of inserting mobile delivery metadata 417 is provided utilizing the code segments below. In the code segment below, the example uses RSS 2.0 code and content provided by syndicated content 410 is illustrated as:

```
<?xml version="1.0"?>
<rss version="2.0">
<channel>
<title>Top business stories</title>
<link>http://www.abc.com/bus/rss</link>
<description> Top business stories</description>
<item>
<title>Wal-Mart reports jump in profit</title>
<link>http://abc.com/click/here.pl?80da344efa6a</link>
<description>Wal-Mart Stores, the world's largest
retailer, on Tuesday reported a jump in earnings
during its key holiday quarter, topping analysts'
estimates.Shares of Wal-Mart jumped nearly 3 percent
</description>
<guid>http://abc.com/id?80da344efa6a</guid>
</item>
...
<item>
...
</item>
</channel>
</rss>
```

As will be appreciated by those skilled in the art, the above content could be delivered to both wired and wireless clients. The above code segment merely illustrates an example of a news report for a financial news provider.

Content publisher 415 receives the above content and inserts mobile delivery metadata 417. This is illustrated in the segment below as:

```
<?xml version="1.0"?>
<rss version="2.0" xmlns:m="http://schemas.com/mcd>
<m:mobile-channel>Cingular:12345</m:mobile-channel>
<m:expire>Wed, 28 Feb 2007 11:59:59 EST</m:expire>
<m:content-priority>low</m:content-priority>
<m:deliver-roaming>No</m:deliver-roaming>
<channel>
<title>Top business stories</title>
<link>http://www.abc.com/bus/rss</link>
<description> Top business stories</description>
<item>
<title>Wal-Mart reports jump in profit</title>
<link>http://abc.com/click/here.pl?80da344efa6a</link>
<description>Wal-Mart Stores, the world's largest
retailer, on Tuesday reported a jump in earnings
during its key holiday quarter, topping analysts'
estimates.Shares of Wal-Mart jumped nearly 3 percent
</description>
<guid>http://abc.com/id?80da344efa6a</guid>
</item>
...
<item>
...
</item>
</channel>
</rss>
```

As illustrated by the bold content, the insertion comprises adding metadata for the delivery server. In particular, in the example above, the XML includes adding a link to a XML namespace m (xmlns:m="http://schemas.com/mcd). The XML namespace m points to an XML schema file that defines various parameters including a mobile channel that should be used, when the content is to expire, the priority of the content and whether the content should be delivered while roaming.

The above example metadata provides that a certain mobile channel should be used for the delivery of the content, as specified by <m:mobile-channel>Cingular:12345</m:mobile-channel>. It also specifies when the content will expire (<m:expire>Wed, 28 February 2007 11:59:59 EST</m:expire>), that the content priority is low (<m:content-priority>low</m:content-priority>) and that it should be delivered while roaming (<m:deliver-roaming>No</m:deliver-roaming>).

The parameters for mobile delivery could be set at the content publisher 415 based on the syndicated content 410. Further, preferences by the mobile device could be provided to content publisher 415 in order to set the parameters.

As will be appreciated, the above are merely examples of various parameters and namespaces that could be specified to delivery server 120 and other parameters and namespaces would be within the scope of the present disclosure. Further, the examples outlined above with relation to namespace m do not necessarily need to be inserted and are merely provided for illustration purposes.

In a further example, content could be in Atom 1.0 format. An example of the same content as above in Atom 1.0 format is:

```
<?xml version="1.0"?>
<feed xmlns="http://www.w3.org/2005/Atom">
<title>Top business stories</title>
<link href="http://www.abc.com/bus/rss/">
<updated>2007-02-21T11:59:55Z</updated>
<id>r816147781</id>
<author><name>ABC.com</name></author>
<entry>
<title>Wal-Mart reports jump in profit</title>
<summary>Wal-Mart Stores, the world's largest
retailer, on Tuesday reported a jump in earnings
during its key holiday quarter, topping analysts'
estimates.Shares of Wal-Mart jumped nearly 3 percent
</summary>
<id>http://abc.com/id?80da344efa6a</id>
<updated>2007-02-21T11:59:55Z</updated>
<link>http://abc.com/click/here.pl?80da344efa6a</link>
</entry>
...
<entry>
...
</entry>
</feed>
```

The content publisher 415 could insert metadata in accordance with the following:

```
<?xml version="1.0"?>
< feed xmlns=http://www.w3.org/2005/Atom
       xmlns:m="http://schemas.com/mcd>
<m:mobile-channel>Cingular:12345</m:mobile-channel>
<m:expire>Wed, 28 Feb 2007 11:59:59 EST</m:expire>
<m:content-priority>low</m:content-priority>
<m:deliver-roaming>No</m:deliver-roaming>
<title>Top business stories</title>
<link href="http://www.abc.com/bus/rss/">
<updated>2007-02-21T11:59:55Z</updated>
<id>r816147781</id>
<author><name>ABC.com</name></author>
<entry>
<title>Wal-Mart reports jump in profit</title>
<summary>Wal-Mart Stores, the world's largest
retailer, on Tuesday reported a jump in earnings
during its key holiday quarter, topping analysts'
estimates.Shares of Wal-Mart jumped nearly 3 percent
</summary>
<id>http://abc.com/id?80da344efa6a</id>
<updated>2007-02-21T11:59:55Z</updated>
<link>http://abc.com/click/here.pl?80da344efa6a</link>
</entry>
...
<entry>
...
</entry>
</feed>
```

As indicated above with reference to the bold insertion, metadata is inserted into the content. Specifically, the same metadata that was inserted in the RSS2.0 feed is also inserted into the present Atom 1.0 content feed.

From both the RRS2.0 and the Atom 1.0 examples, it will be appreciated that the content publisher does not touch or open the content and inserts metadata at the earliest opportunity within the content stream. In this case, it is immediately after the RSS version is specified in the RSS2.0 feed and after the name space for the Atom content is defined for the Atom 1.0 content.

Figure 5:
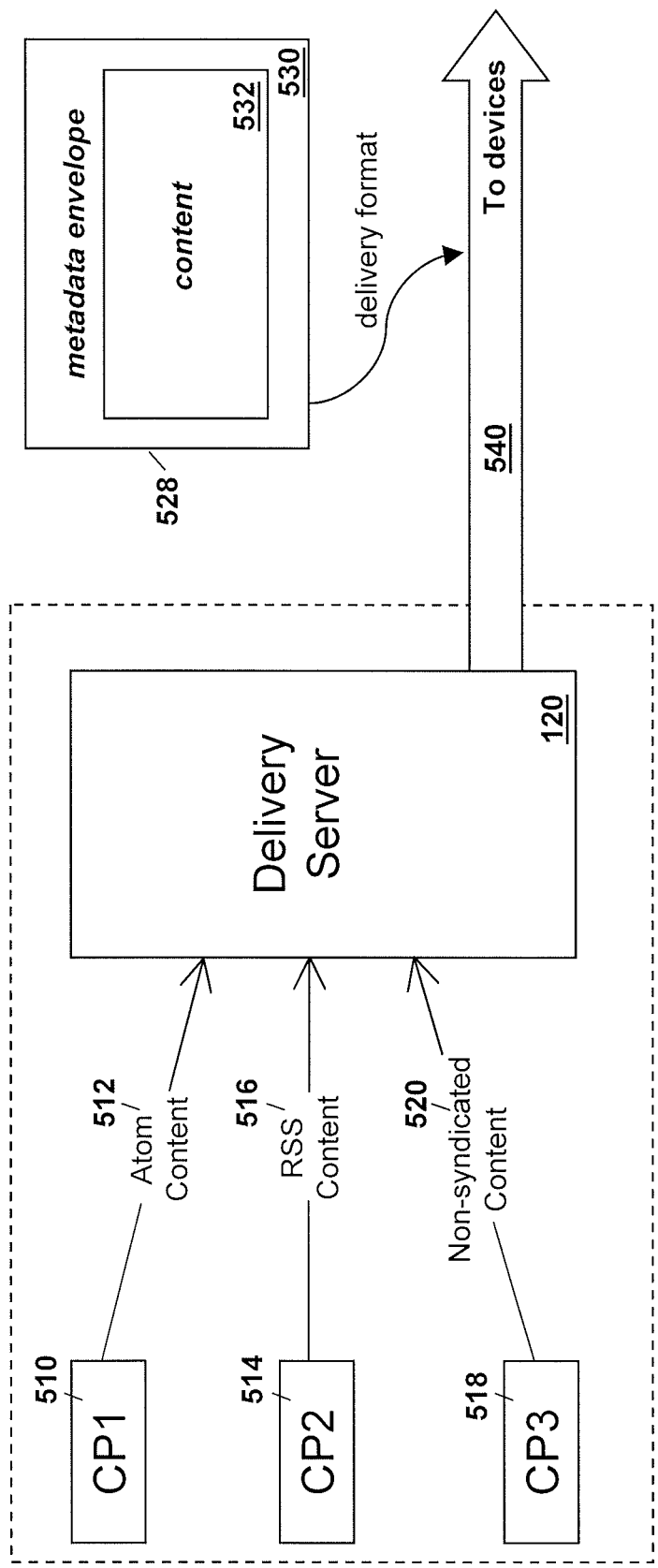
FIG. 5 is a block diagram showing a server side delivery framework having multiple content publishers.
Figure 6:
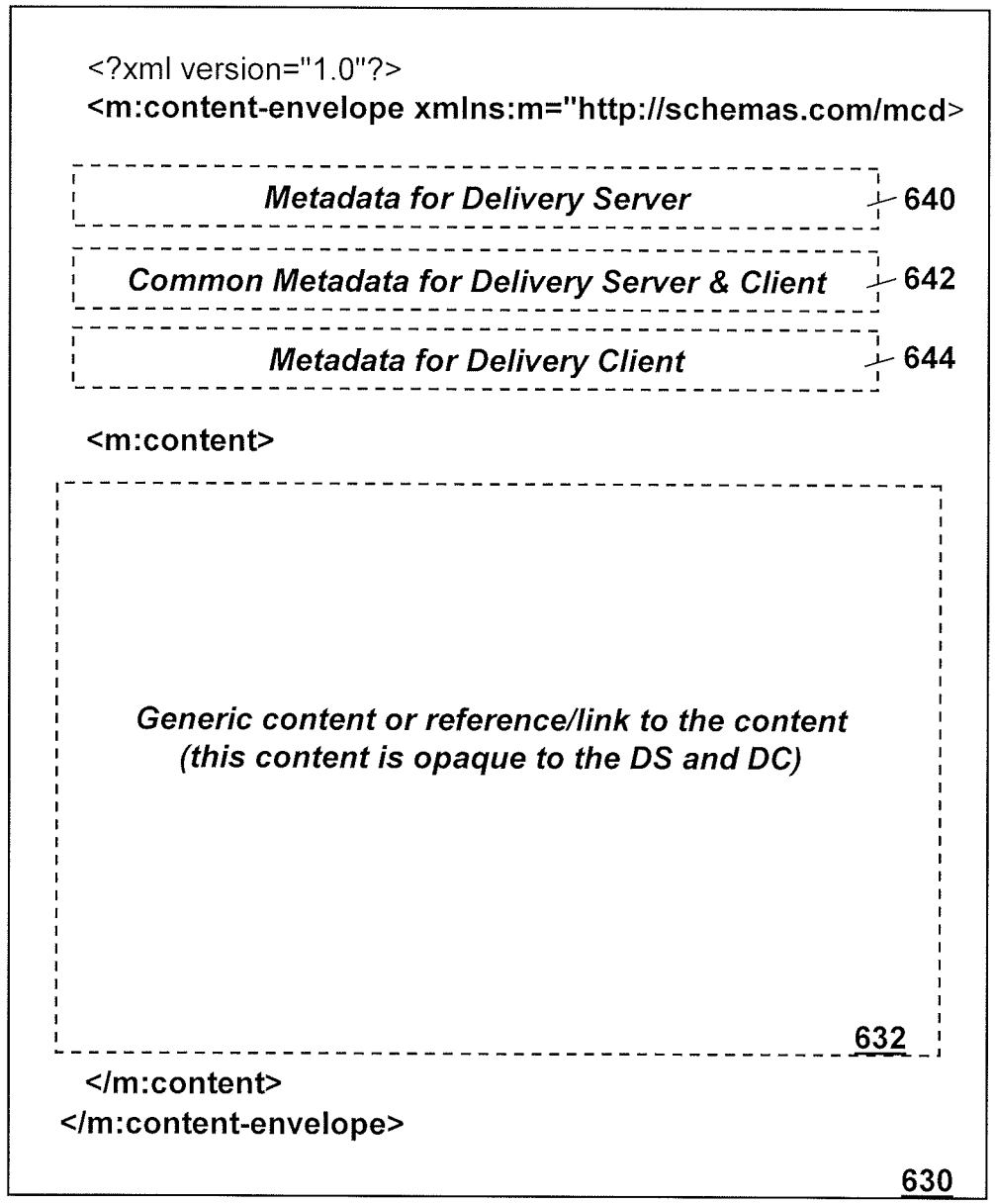
FIG. 6 is a block diagram of non-syndicated content within a metadata envelope.

Reference is now made to FIG. 5. To ensure interoperability and to simplify implementation of delivery clients on devices, only a single, common delivery format is supported in a preferred embodiment. The content is wrapped with a metadata envelope such as an XML envelope containing delivery metadata. Delivery server 120 must repackage syndicated feeds into a common delivery format.

As illustrated in FIG. 5, a first content publisher 510 produces Atom content 512.

A second content publisher 514 produces RSS content 516.

A third content publisher 518 produces non-syndicated content 520. Non-syndicated content 520 could be anything, including binary, video, and text, among others.

Delivery server 120 gets Atom content 512, RSS content 516 and non-syndicated content 520 and is adapted to repackage the feeds into a common delivery format. As illustrated in FIG. 5, metadata envelope 530 is wrapped around content 532, which can include any of the content 512, 516 or 520. This is passed in single delivery format 540 to devices expecting the content. Thus, as illustrated in FIG. 5, three formats are converted to one format for delivery to the device.

The repackaging for delivery comprises taking the published content that was published by either content provider 510, content provider 514 or content provider 518 and converting it for delivery. This involves, for example, taking the code segment below and converting it to an envelope model 528 from FIG. 5.

Thus, as provided above, published content could be:

```
<?xml version="1.0"?>
<rss version="2.0" xmlns:m="http://schemas.com/mcd">
<m:mobile-channel>Cingular:12345</m:mobile-channel>
<m:expire>Wed, 28 Feb 2007 11:59:59 EST</m:expire>
<m:content-priority>low</m:content-priority>
<m:deliver-roaming>No</m:deliver-roaming>
<channel>
<title>Top business stories</title>
<link>http://www.abc.com/bus/rss</link>
<description> Top business stories</description>
<item>
<title>Wal-Mart reports jump in profit</title>
<link>http://abc.com/click/here.pl?80da344efa6a</link>
<description>Wal-Mart Stores, the world's largest
retailer, on Tuesday reported a jump in earnings
during its key holiday quarter, topping analysts'
estimates.Shares of Wal-Mart jumped nearly 3 percent
</description>
<guid>http://abc.com/id?80da344efa6a</guid>
</item>
...
<item>
...
</item>
</channel>
</rss>
```

Delivery server repackages the content to create an enveloped model 528 which includes the metadata envelope 530 and the content 532. An example of the code could be:

```
<?xml version="1.0"?>
<m:content-envelope xmlns:m="http://schemas.com/mcd">
<m:mobile-channel>Cingular:12345</m:mobile-channel>
<m:expire>Wed, 28 Feb 2007 11:59:59 EST</m:expire>
<m:content-priority>low</m:content-priority>
<m:deliver-roaming>No</m:deliver-roaming>
<m:content>
    <rss version="2.0">
<channel>
<title>Top business stories</title>
<link>http://www.abc.com/bus/rss</link>
<description> Top business stories</description>
<item>
<title>Wal-Mart reports jump in profit</title>
<link>http://abc.com/click/here.pl?80da344efa6a</link>
<description>Wal-Mart Stores, the world's largest
retailer, on Tuesday reported a jump in earnings
during its key holiday quarter, topping analysts'
estimates.Shares of Wal-Mart jumped nearly 3 percent
</description>
<guid>http://abc.com/id?80da344efa6a</guid>
</item>
...
</channel>
</rss>
```

```
</m:content>
</m:content-envelope>
```

From the above, the bold is the metadata envelope 530 and the non-bold is the content. The content, as will be appreciated, has not been touched by either the content publisher or the delivery server 120.

For non-syndicated content 520, a similar process occurs. Specifically, referring to FIG. 6, a non-syndicated packaging could include the content 632 with a metadata envelope 630. In this case, the metadata envelope could include metadata for the delivery server 640; common metadata for both the delivery server and the client 642; and metadata for the delivery client 644.

The metadata for the delivery server is extracted by the delivery server prior to the delivery between the delivery server and the delivery client. Common metadata for the delivery server and delivery client 642 is read by the delivery server and can be processed. Examples include expiry dates for content. If content is not delivered by a certain date, then the delivery server could discard the packet.

Conversely, the common metadata could be used at the client side if the content is delivered to the client but the client application has not been opened in order to have the delivery client deliver the content to the content application. In this case, the delivery client could read the expiry date and could discard the content if the expiry date has passed.

Metadata for the delivery client 644 remains in the non-syndicated content package and is passed to the delivery client.

Figure 7:
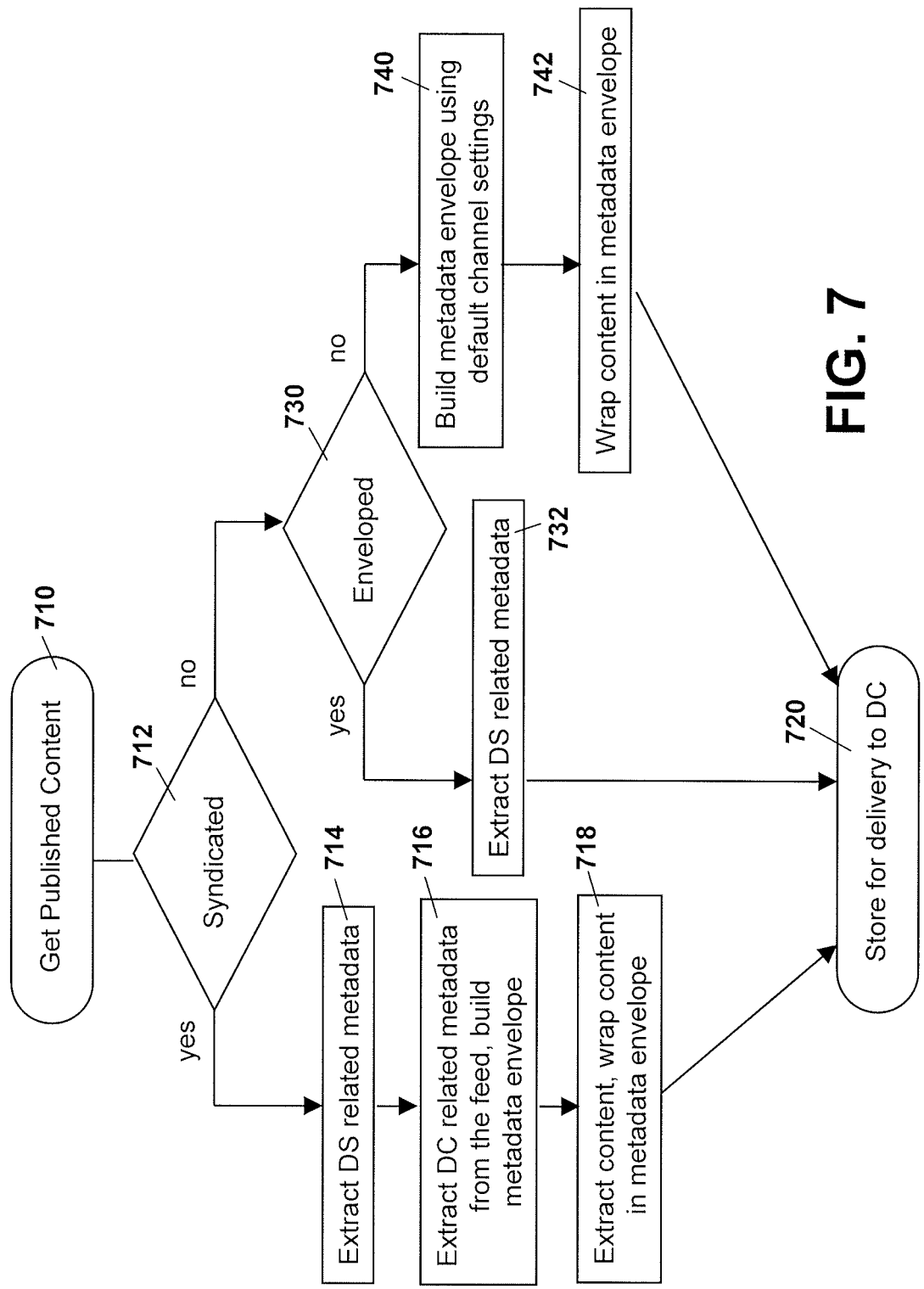
FIG. 7 is a flow chart illustrating a method for wrapping content in metadata.

The above can be better seen with reference to FIG. 7. FIG. 7 shows a flow chart for packaging content. As will be appreciated, the delivery server generally performs this method.

In step 710, the method comprises getting the published content. Step 712 is a check to see whether or not the content is syndicated. If yes, the process proceeds to step 714 in which delivery server related metadata is extracted from the content.

The process then proceeds to step 716 in which delivery client related metadata is extracted from the feed and a metadata envelope is built.

In step 718, content is then extracted and the content is wrapped in the metadata envelope created in step 716.

The process then proceeds to step 720 in which the content that is wrapped in the metadata envelope is stored for delivery to the delivery client.

If, in step 712, it is found that the content is not syndicated, the process then proceeds to step 730. In step 730 a check is made to see whether or not the content is enveloped. If yes, the process proceeds to step 732 in which delivery server related metadata is extracted from the envelope content and the delivery server can then process the content in relation to the extracted metadata.

From step 732, the process proceeds to step 720 in which the remaining content that is enveloped is stored for delivery to a delivery client.

If, in step 730, it is found that the content is not enveloped, the process proceeds to step 740. In step 740, a metadata envelope is built using default channel settings. Thus, for example, a delivery server will include default settings for a particular delivery client or a particular mobile device associated with the delivery client. The metadata envelope can thus be created using these default channel settings.

In step 742, the content is wrapped in the metadata envelope that was created in step 740 and the process then proceeds to step 720 in which the wrapped content is stored for delivery to the delivery client.

Thus, from FIG. 7, data in various formats whether syndicated or enveloped, can be wrapped in metadata and stored for delivery to a delivery client. The data stored in step 720 is in a uniform format including an envelope wrapped around the content in order to provide for uniform delivery to a delivery client, simplifying the implementation of a delivery client on a mobile device.

The above therefore provides for the embedding of mobile delivery metadata at publishing at the delivery server. A content publisher embeds the metadata for control of mobile delivery inside the syndicated content feed. The metadata is embedded using a standard XML scheme extension mechanism in a preferred embodiment.

Further, the content that is published with the metadata is then transformed at the delivery server into a delivery server—delivery content delivery format. Any form of syndicated content is contemplated, and in a particular example, an RSS or Atom or other XML based syndicated content feed is contemplated. This RSS, Atom or other XML based syndicated content is transformed into an XML envelope format for delivering to a delivery client.

Figure 8:
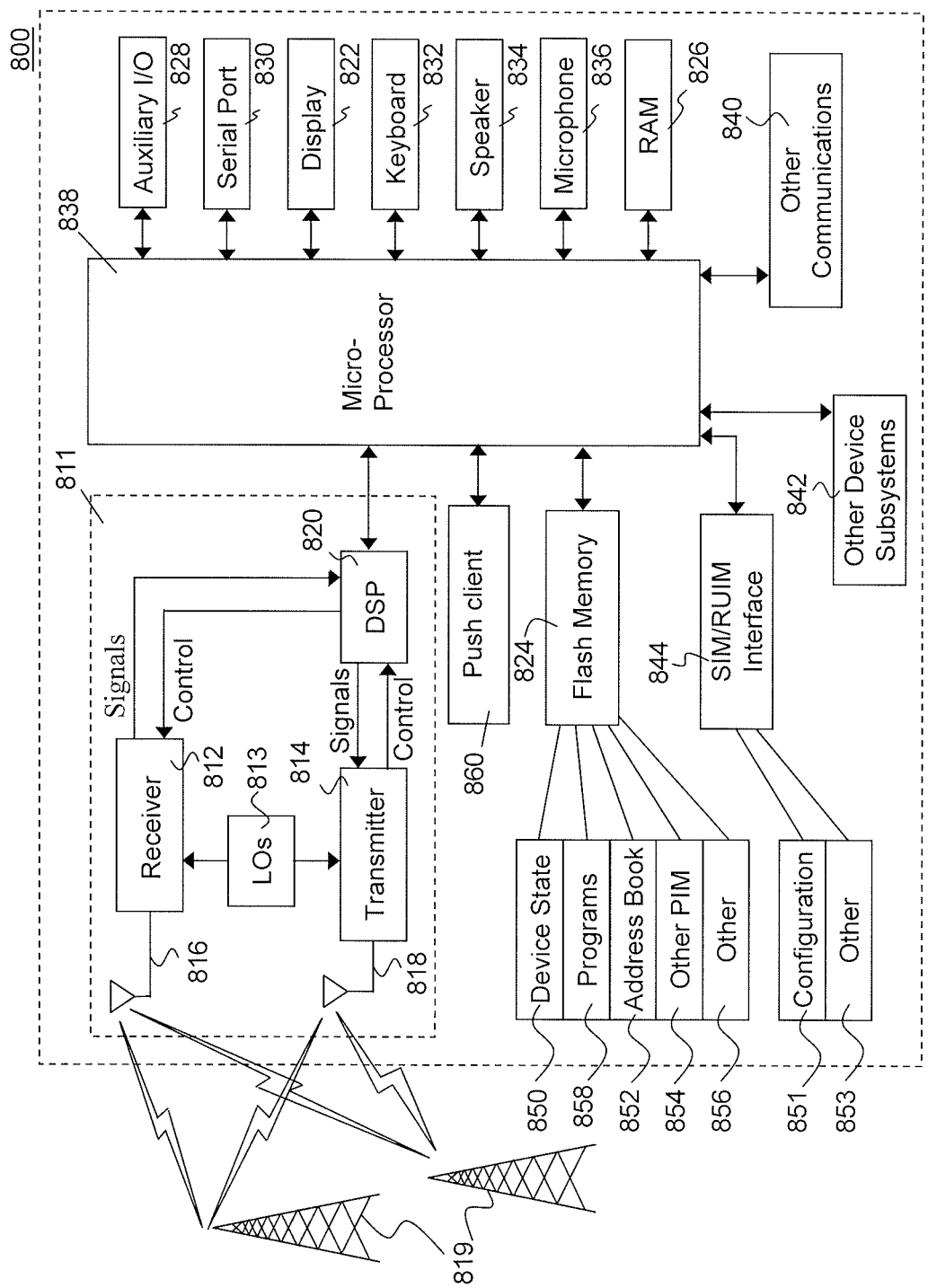
FIG. 8 is an exemplary mobile device that can be used in association with present method and system.

The delivery client and the content client or content application can be found on any mobile device. One particular mobile device that is illustrated in the example is provided in FIG. 8. Reference is now made to FIG. 8.

FIG. 8 is a block diagram illustrating a mobile station apt to be used with preferred embodiments of the apparatus and method of the present application. Mobile station 800 is preferably a two-way wireless communication device having at least voice and data communication capabilities. Mobile station 800 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 800 is enabled for two-way communication, it will incorporate a communication subsystem 811, including both a receiver 812 and a transmitter 814, as well as associated components such as one or more, preferably embedded or internal, antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate.

Network access requirements will also vary depending upon the type of network 819. In some CDMA networks network access is associated with a subscriber or user of mobile station 800. A CDMA mobile station may require a removable user identity module (RUIM) or a subscriber identity module (SIM) card in order to operate on a CDMA network. The SIM/RUIM interface 844 is normally similar to a card-slot into which a SIM/RUIM card can be inserted and ejected like a diskette or PCMCIA card. The SIM/RUIM card can have approximately 64K of memory and hold many key configuration 851, and other information 853 such as identification, and subscriber related information.

When required network registration or activation procedures have been completed, mobile station 800 may send and receive communication signals over the network 819. As illustrated in FIG. 8, network 819 can consist of multiple base stations communicating with the mobile device. For example, in a hybrid CDMA 1x EVDO system, a CDMA base station and an EVDO base station communicate with the mobile station and the mobile station is connected to both simultaneously. The EVDO and CDMA 1x base stations use different paging slots to communicate with the mobile device.

Signals received by antenna 816 through communication network 819 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile station 800 preferably includes a microprocessor 838 which controls the overall operation of the device. Communication functions, including at least data and voice communications, are performed through communication subsystem 811. Microprocessor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. Serial port 830 could include a USB port or other port known to those in the art.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the microprocessor 838 is preferably stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Microprocessor 838, in addition to its operating system functions, preferably enables execution of software applications on the mobile station. A predetermined set of applications that control basic operations, including at least data and voice communication applications for example, will normally be installed on mobile station 800 during manufacturing. Other applications could be installed subsequently or dynamically.

A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 819. In a preferred embodiment, the PIM data items are seamlessly integrated, synchronized and updated, via the wireless network 819, with the mobile station user's corresponding data items stored or associated with a host computer system. Further applications may also be loaded onto the mobile station 800 through the network 819, an auxiliary I/O subsystem 828, serial port 830, short-range communications subsystem 840 or any other suitable subsystem 842, and installed by a user in the RAM 826 or preferably a non-volatile store (not shown) for execution by the microprocessor 838. Such flexibility in application installation increases the functionality of the device and may provide enhanced on-device functions, communication-related functions, or both. For example, secure communication applications may enable electronic commerce functions and other such financial transactions to be performed using the mobile station 800.

In a data communication mode, a received signal such as a text message or web page download will be processed by the communication subsystem 811 and input to the microprocessor 838, which preferably further processes the received signal for output to the display 822, or alternatively to an auxiliary I/O device 828. A delivery client 860, which could be equivalent to delivery client 140 could also process the input.

A user of mobile station 800 may also compose data items such as email messages for example, using the keyboard 832, which is preferably a complete alphanumeric keyboard or telephone-type keypad, in conjunction with the display 822 and possibly an auxiliary I/O device 828. Such composed items may then be transmitted over a communication network through the communication subsystem 811.

For voice communications, overall operation of mobile station 800 is similar, except that received signals would preferably be output to a speaker 834 and signals for transmission would be generated by a microphone 836. Alternative voice or audio I/O subsystems, such as a voice message recording subsystem, may also be implemented on mobile station 800. Although voice or audio signal output is preferably accomplished primarily through the speaker 834, display 822 may also be used to provide an indication of the identity of a calling party, the duration of a voice call, or other voice call related information for example.

Serial port 830 in FIG. 8, would normally be implemented in a personal digital assistant (PDA)-type mobile station for which synchronization with a user's desktop computer (not shown) may be desirable, but is an optional device component. Such a port 830 would enable a user to set preferences through an external device or software application and would extend the capabilities of mobile station 800 by providing for information or software downloads to mobile station 800 other than through a wireless communication network. The alternate download path may for example be used to load an encryption key onto the device through a direct and thus reliable and trusted connection to thereby enable secure device communication. As will be appreciated by those skilled in the art, serial port 830 can further be used to connect the mobile device to a computer to act as a modem.

Other communications subsystems 840, such as a short-range communications subsystem, is a further optional component which may provide for communication between mobile station 800 and different systems or devices, which need not necessarily be similar devices. For example, the subsystem 840 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for repackaging content at a delivery server for delivery to a mobile device, the method comprising the steps of:
receiving at the delivery server, published content having embedded metadata and embedded content;
checking whether the published content is syndicated;
if the published content is syndicated:
extracting from the published content the embedded metadata;
wrapping the embedded content with at least a portion of the extracted metadata, creating wrapped content; and
if the published content is not syndicated:
checking whether the published content is enveloped:
if the published content is enveloped, extracting metadata related to the delivery server;
if the published content is not enveloped, utilizing default metadata to create enveloped content; and
sending the enveloped content to the mobile device.

2. The method of claim 1, further comprising:
retrieving published content without embedded metadata configured to wrap content; and
wrapping the published content in default metadata configured to wrap content.

3. The method of claim 2, wherein the default metadata is created based on default channel settings for delivery to the mobile device.

4. The method of claim 1, wherein the published content can be in different formats.

5. The method of claim 4, wherein the different formats are selected from Atom content, RSS content and non-syndicated content.

6. The method of claim 1, wherein the wrapping step leaves the embedded content unaltered.

7. The method of claim 1, further comprising the step of, prior to the wrapping step, adding metadata to the extracted metadata.

8. The method of claim 1, wherein the wrapped content is in a single format.

9. The method of claim 8, wherein the single format is an XML envelope format.

10. The method of claim 1, further comprising storing, in a memory associated with the delivery server, the wrapped content for delivery.

11. An apparatus for repackaging content at a delivery server for delivery to a mobile device, the apparatus comprising:
a processor; and
a memory comprising instructions that, when executed, cause the processor to:
receive, at the delivery server, published content having embedded metadata and embedded content;
check whether the published content is syndicated;
if the published content is syndicated:
extract from the published content the embedded metadata;
wrap the embedded content with at least a portion of the extracted metadata, creating wrapped content; and
if the published content is not syndicated:
check whether the published content is enveloped;
if the published content is enveloped, extract metadata related to the delivery server;

if the published content is not enveloped, utilize default metadata to create enveloped content; and send the enveloped content to the mobile device.

12. The apparatus of claim 11, wherein the default metadata is created based on default channel settings for delivery to the mobile device.

13. The method of claim 11, wherein the published content can be different formats selected from Atom content and RSS content.

14. A non-transitory computer-readable medium comprising instructions that, when performed by a processor, cause the processor to:

receive, at the delivery server, published content having embedded metadata and embedded content;

check whether the published content is syndicated;

if the published content is syndicated:

extract from the published content the embedded metadata;

wrap the embedded content with at least a portion of the extracted metadata, creating wrapped content; and if the published content is not syndicated:

check whether the published content is enveloped;

if the published content is enveloped, extract metadata related to the delivery server;

if the published content is not enveloped, utilize default metadata to create enveloped content; and send the envelope to the mobile device.

* * * * *